United States Patent
Zamyatin et al.

(10) Patent No.: US 9,224,216 B2
(45) Date of Patent: Dec. 29, 2015

(54) HIGH DENSITY FORWARD PROJECTOR FOR SPATIAL RESOLUTION IMPROVEMENT FOR MEDICAL IMAGING SYSTEMS INCLUDING COMPUTED TOMOGRAPHY

(71) Applicants: KABUSHIKI KAISHA TOSHIBA, Tokyo (JP); TOSHIBA MEDICAL SYSTEMS CORPORATION, Tochigi (JP)

(72) Inventors: Alexander Zamyatin, Hawthorn Woods, IL (US); Yongsheng Pan, Vernon Hills, IL (US); Zhi Yang, Vernon Hills, IL (US)

(73) Assignees: KABUSHIKI KAISHA TOSHIBA, Tokyo (JP); TOSHIBA MEDICAL SYSTEMS CORPORATION, Tochigi (JP)

(*) Notice: Subject to any disclaimer, the term of this patent is extended or adjusted under 35 U.S.C. 154(b) by 98 days.

(21) Appl. No.: 13/956,001

(22) Filed: Jul. 31, 2013

(65) Prior Publication Data
US 2015/0036902 A1 Feb. 5, 2015

(51) Int. Cl.
*G06K 9/00* (2006.01)
*G06T 11/00* (2006.01)
*G06T 7/00* (2006.01)

(52) U.S. Cl.
CPC ............ *G06T 11/003* (2013.01); *G06T 7/0012* (2013.01); *G06T 11/005* (2013.01);
(Continued)

(58) Field of Classification Search
None
See application file for complete search history.

(56) References Cited

U.S. PATENT DOCUMENTS 4,550,371 A * 10/1985 Glover .................. G06T 11/005
378/19
4,555,760 A * 11/1985 Op de Beek .......... G06T 11/006
378/17
(Continued)

FOREIGN PATENT DOCUMENTS

JP          9-19425 A    1/1997
JP     2004-195050 A    7/2004
(Continued)

OTHER PUBLICATIONS

SJ Doran, T Brochard, J Adamovics, N Krstajic, and E Brauer-Krisch. "An investigation of the potential of optical computed tomography for imaging of synchrotron-generated x-rays at high spatial resolution." Phys Med Biol. Mar. 7, 2010;55(5):1531-47. doi: 10.1088/0031-9155/55/5/018. Epub Feb. 16, 2010.*
(Continued)

*Primary Examiner* — Matthew Bella
*Assistant Examiner* — Soo Shin
(74) *Attorney, Agent, or Firm* — Oblon, McClelland, Maier & Neustadt, L.L.P.

(57) ABSTRACT

A medical imaging apparatus, processing device or specialized circuit can include an input interface to input scan data of a medical image scan of a target object, a processor to generate an output image from the input scan data, and an output interface to output the output image to, e.g., a display. The processor can execute a first reconstruction of the scan data to obtain an intermediate image of the target object, a high-density forward projection of the intermediate object to obtain generated data, a sinogram updating using both of the generated data and the scan data to obtain a high-resolution sinogram, and a second reconstruction based on the high-resolution sinogram to obtain an output image.

18 Claims, 10 Drawing Sheets

(52) U.S. Cl.
CPC ............. *G06T11/006* (2013.01); *G06T 11/008* (2013.01); *G06T 2207/10081* (2013.01); *G06T 2207/20056* (2013.01); *G06T 2207/30004* (2013.01); *G06T 2211/40* (2013.01); *G06T 2211/424* (2013.01)

(56) References Cited

U.S. PATENT DOCUMENTS

| | | | | |
|---|---|---|---|---|
| 5,210,688 | A | * | 5/1993 | Cheu .................. G06T 5/002 378/19 |
| 5,825,842 | A | * | 10/1998 | Taguchi ............. A61B 6/032 378/15 |
| 6,411,670 | B1 | * | 6/2002 | Besson ............. G06T 11/005 378/4 |
| 6,771,732 | B2 | | 8/2004 | Xiao et al. |
| 7,215,731 | B1 | | 5/2007 | Basu et al. |
| 7,602,879 | B2 | * | 10/2009 | Chen .................. G06T 11/006 378/4 |
| 7,729,526 | B2 | | 6/2010 | George et al. |
| 2003/0161443 | A1 | | 8/2003 | Xiao et al. |
| 2006/0034417 | A1 | * | 2/2006 | Katsevich ............ A61B 6/4441 378/4 |
| 2006/0233459 | A1 | * | 10/2006 | Lange .................. G06T 11/006 382/276 |
| 2006/0257010 | A1 | | 11/2006 | George et al. |
| 2007/0098133 | A1 | | 5/2007 | Chen et al. |
| 2010/0002955 | A1 | | 1/2010 | George et al. |
| 2010/0322514 | A1 | * | 12/2010 | Koehler ............. A61B 6/5258 382/173 |
| 2013/0094739 | A1 | * | 4/2013 | Okabe .................. A61B 6/032 382/131 |
| 2013/0101191 | A1 | | 4/2013 | Zamyatin et al. |
| 2013/0243299 | A1 | | 9/2013 | Goto et al. |
| 2014/0185898 | A1 | * | 7/2014 | Park ...................... G06T 11/005 382/131 |

FOREIGN PATENT DOCUMENTS

| | | |
|---|---|---|
| JP | 2005-518892 A | 6/2005 |
| JP | 2007-504912 A | 3/2007 |
| JP | 2013-85955 A | 5/2013 |
| WO | WO 2012/077694 A1 | 6/2012 |

OTHER PUBLICATIONS

International Search Report issued Sep. 2, 2014 in PCT/JP2014/070273 (without English Translation).
Boedeker et al., "Effect of Spatial Direction and Acquisition Techniques on Noise Power Spectra in X-Ray CT," Proc. SPIE 6913, Medical Imaging 2008: Physics of Medical Imaging, 69134X, 8 pages, 2008.
Zeng et al., "Spatial Resolution Enhancement in CT Iterative Reconstruction," IEEE Nuclear Science Symposium Conference Record, 2009, pp. 3748-3751.
Kao et al., "Fourier-based optimal recovery method for antialiasing interpolation," Society of Photo-Optical Instrumentation Engineers, 38(12), pp. 2041-2044, Dec. 1999.
Ballester, et al., "A Variational Model for P+XS Image Fusion," International Journal of Computer Vision 69(1), pp. 43-58, 2006.

* cited by examiner

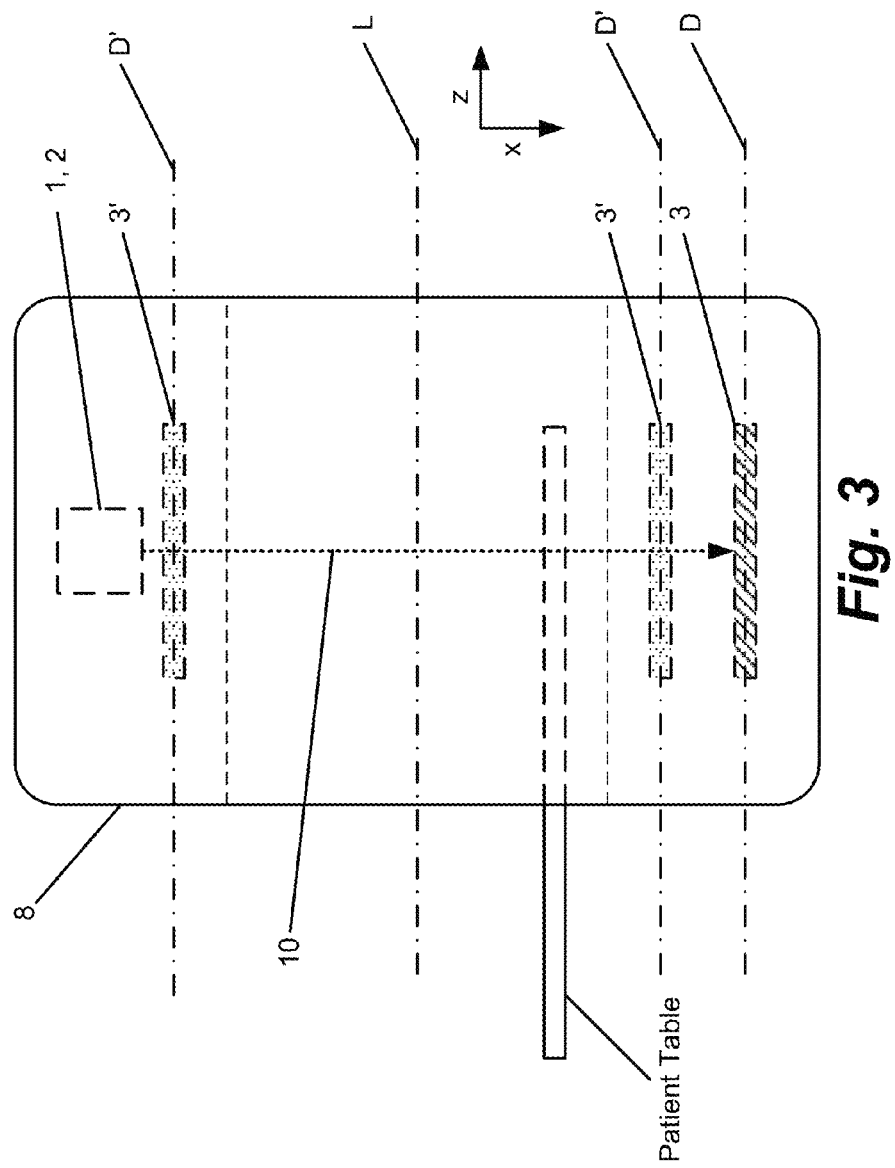

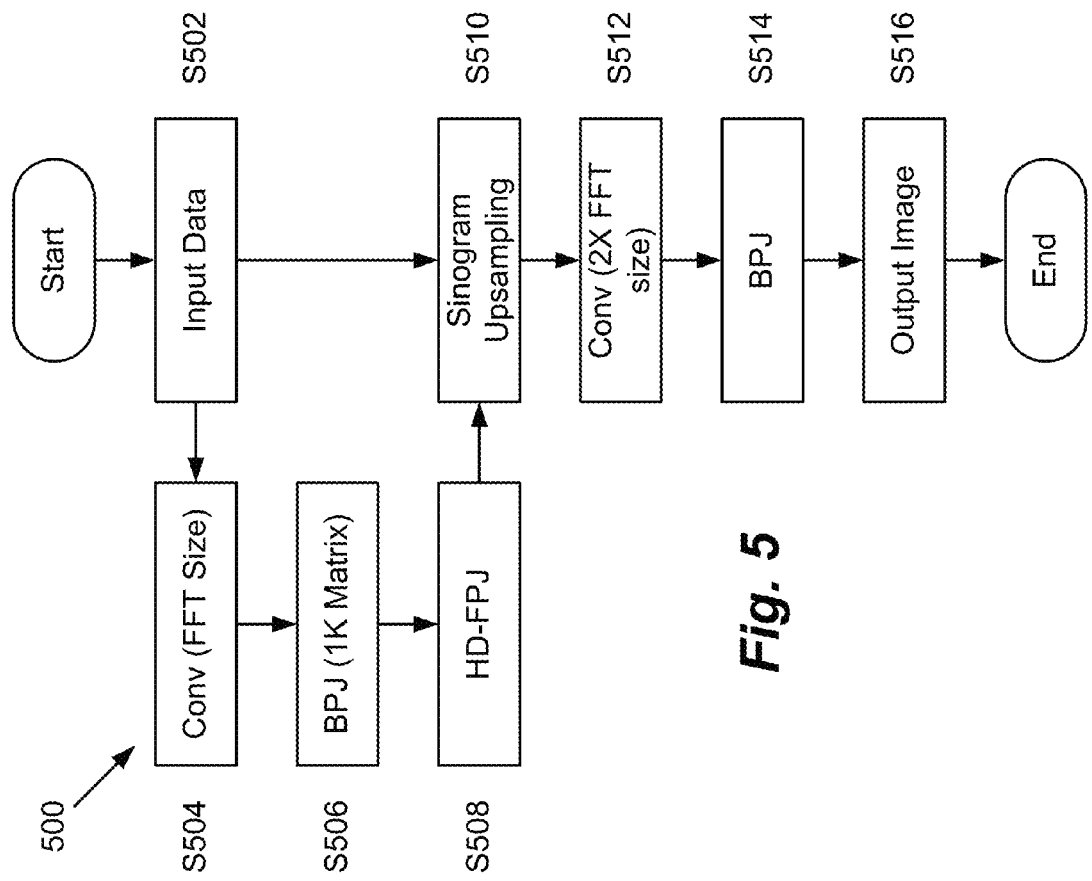
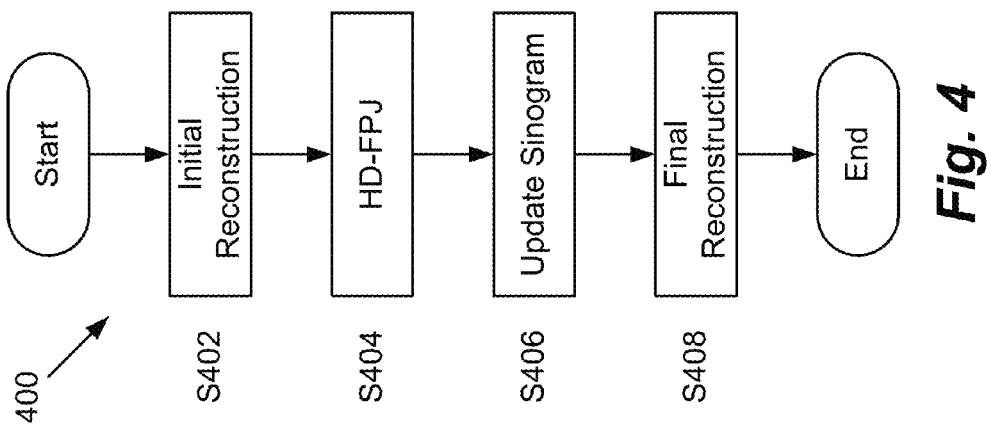
Fig. 5
Fig. 4

HIGH DENSITY FORWARD PROJECTOR FOR SPATIAL RESOLUTION IMPROVEMENT FOR MEDICAL IMAGING SYSTEMS INCLUDING COMPUTED TOMOGRAPHY

FIELD

The exemplary implementations described herein relate to computed tomography (CT) systems.

BACKGROUND

X-ray tomographic imaging, in its simplest expression, is an X-ray beam traversing an object, and a detector relating the overall attenuation per ray. The attenuation is derived from a comparison of the same ray with and without the presence of the object. From this conceptual definition, several steps are required to properly construct/reconstruct an image. For instance, the finite size of the X-ray generator, the nature and shape of the filter blocking the very low energy X-rays from the generator, the details of the geometry and characteristics of the detector and the capacity of the acquisition system are all elements that affect how reconstruction is performed.

In one of many possible geometries, an X-ray source on top of the graph shown in FIG. 1 is emitting an X-ray beam forming a fan or cone, traversing the object. While a wide range of values can exist, typically, the distance "C" is around 100 cm, "B" is around 60 cm, and "A" is around 40 cm. In tomography, each point of the object can be traversed by a collection of rays covering at least 180 degrees. Thus, the entire X-ray generator and detector assembly can rotate around the patient. Mathematical considerations show that tomographic conditions are met when a scan of 180 degrees plus a fan angle is performed.

Spatial resolution of a reconstructed image is limited by various system factors, such as focal spot size, detector pixel size, image voxel size, etc. Resolution degradation is evident in cases of zoomed reconstruction, such as that used in sinuses, coronary artery, or cochlear implant imaging. In the case of a zoomed reconstruction image, voxel size becomes small and does not affect spatial resolution. A detector pixel size limitation has two effects on spatial resolution: (1) data is averaged over a pixel size area; and (2) detector sampling pitch, which determines Nyquist frequency and fundamentally limits spatial resolution of the reconstructed function. The detector pixel size, as well as the focal spot size, can be mitigated by a conventional deconvolution-type approach.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIG. 3 is a schematic diagram of a mechanically simplified CT apparatus with a detector extending in a direction of a longitudinal axis;

FIG. 4 is a flowchart of an exemplary algorithmic process;

FIG. 5 is a flowchart of another exemplary algorithmic process;

DETAILED DESCRIPTION

Figure 1:
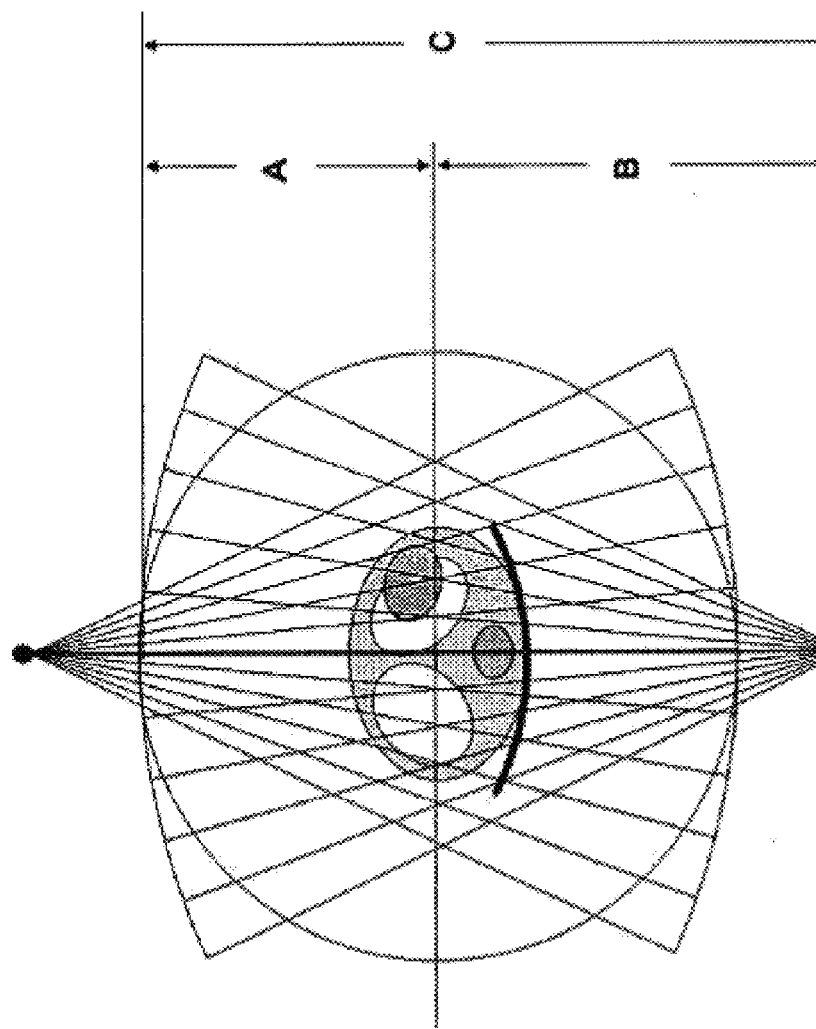
FIG. 1 illustrates an X-ray source emitting an X-ray beam forming a fan or cone, traversing an object.

According to exemplary implementations, a medical imaging system can perform an initial reconstruction in a high-resolution mode to obtain an intermediate image of original data, where the original data pertains to a scanned object. High-density forward projection of the intermediate image can be executed to obtain generated data. Sinogram updating can be executed using both the original data and the generated data to obtain a high-resolution sinogram. A final reconstruction is then executed to obtain a high-resolution image of the scanned object.

According to an exemplary implementation, an input interface can input scan data of a medical image scan of a target object, a processor can execute procedures, and an output interface can output the output image. The procedures can include a first reconstruction of the scan data to obtain an intermediate image of the target object, a high-density forward projection of the intermediate object to obtain generated data, a sinogram updating using both of the generated data and the scan data to obtain a high-resolution sinogram, and a second reconstruction based on the high-resolution sinogram to obtain an output image.

The first reconstruction can include a convolution executed on the scan data to filter the scan data by a Fourier transform. The first reconstruction can include executing a back-projection, after the convolution, to obtain the intermediate image.

The sinogram updating can be in accordance with the following relationships, in which x denotes an original sinogram, y denotes a generated sinogram, and z denotes an updated sinogram:

$$z(2k)=x(k), \text{ and}$$

$$z(2k+1)=y(2k+1)+(\Delta(k)+\Delta(k+1))/2,$$

where $\Delta(k)=x(k)-y(2k)$.

The second reconstruction can include a convolution executed to filter the high-resolution sinogram by a Fourier transform. The second reconstruction can include executing a back-projection, after the convolution, to obtain the output image.

The first reconstruction can include a first convolution executed on the scan data to filter the scan data by a Fast Fourier Transform (FFT) having a first size, and then a first back-projection executed utilizing a first matrix. The second reconstruction can include a second convolution executed on the scan data to filter the scan data by a Fast Fourier Transform (FFT) having a second size, which is twice the size of the first size, and then a second back-projection executed utilizing a second matrix.

The first size can be 512 bins and the second size is 1024 bins.

The first and second matrices can each have a size of 1024×1024.

The scan data of the medical image scan of the target object can be computed tomography (CT) scan data and the medical image scan can be a CT scan.

A CT device to perform the CT scan is provided in an exemplary implementation.

The processor can be to execute the sinogram updating using the generated data and the scan data to obtain the high-resolution sinogram to improve a spatial resolution of the output image from the second reconstruction relative to the intermediate image of the second reconstruction.

A display can be provided to display the output image.

Various methods, systems, devices, and computer-readable medium can be implemented in accordance with this disclosure.

In the drawings, like reference numerals designate identical or corresponding parts throughout the several views. Further, as used herein, the words "a," "an" and the like generally carry a meaning of "one or more," unless stated otherwise. Any reference, patent or other document discussed herein is incorporated in its entirety by reference.

Figure 2:
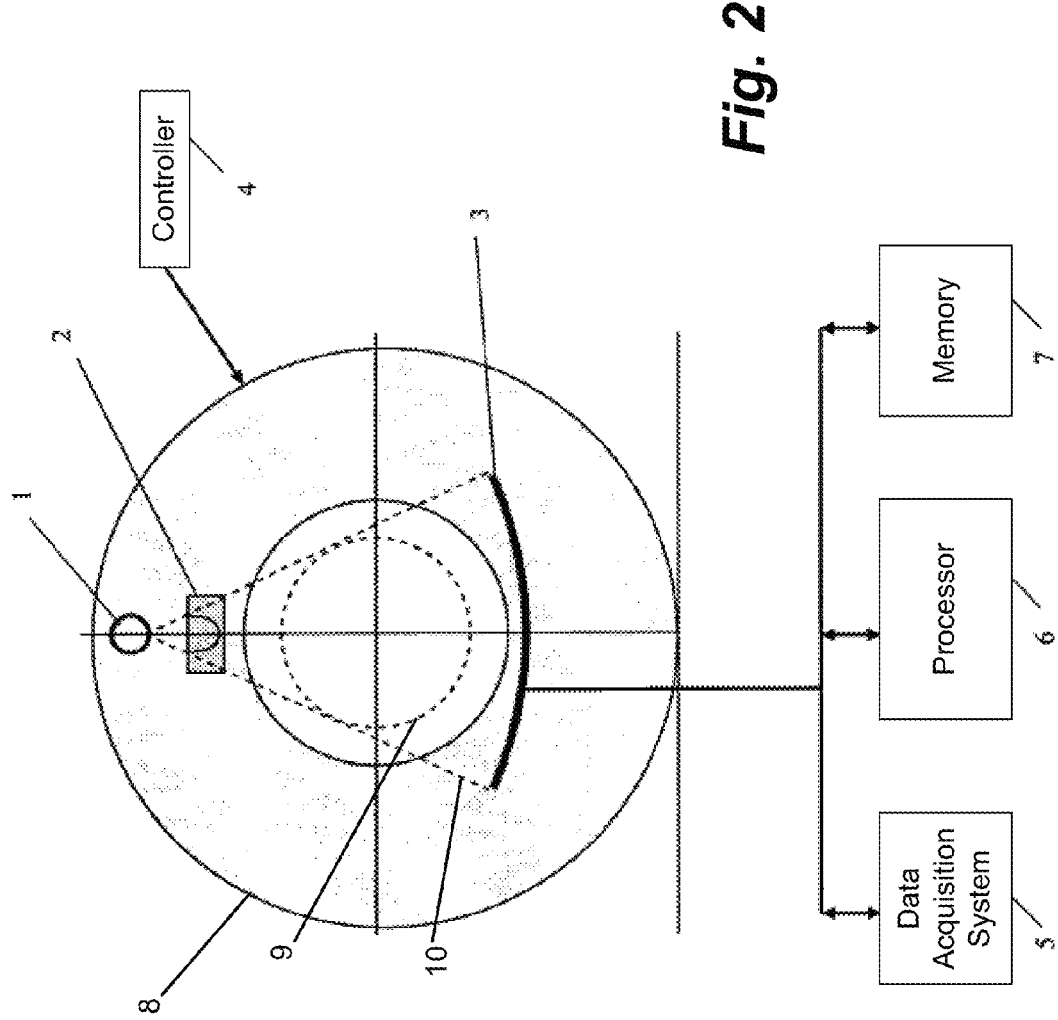
FIG. 2 is a schematic diagram of a mechanically simplified CT apparatus.

FIG. 2 illustrates a simplified schematic structure of a CT apparatus that can include a detector array to detect photons. Aspects of this disclosure are not restricted to a CT apparatus as the medical imaging system. In particular, the structures and procedures described herein can be applied to other medical imaging systems, and the descriptions provided herein specifically relating to a CT apparatus and the detection of photons should be considered as exemplary.

A detector array, a photon detector and/or a photon detector array may be referred to herein merely as a detector. The CT apparatus illustrated in FIG. 2 includes an X-ray tube 1, filters and collimators 2, and a detector 3. The CT apparatus also includes additional mechanical and electrical components such as a gantry motor and a controller 4 to control the rotation of the gantry, control the X-ray source, and control a patient bed. The CT apparatus also includes a data acquisition system 5 and a processor 6 to generate CT images based on the projection data acquired by the data acquisition system. The processor and data acquisition system can make use of a memory 7, which is configured to store, e.g., data obtained from the detector and reconstructed images.

The X-ray tube 1, filters and collimators 2, detector 3 and controller 4 can be provided in a frame 8 that includes a bore. The frame 8 has a general cylindrical or donut shape. In the view shown in FIG. 2, a longitudinal axis of the bore of the frame 8 is in the center of the bore, and extends into and out of the page. An interior of the bore, identified as area 9, is a target area for imaging. An object to be scanned, such as a patient, is placed in the target area with, e.g., a patient table. The object can then be irradiated by the X-ray tube 1 with a fan or cone of radiation 10, which generally, substantially or effectively cross-sects the object with respect to the longitudinal axis. The processor 6 is programmed to determine photon counts of captured incident X-ray photons. The data acquisition system 5, the processor 6, and the memory 7 can be implemented as a single machine or computer, or as separate machines or computers that are coupled together via a network or other data communication system. The controller 4 can also be coupled via the network or other data communication system, and can be implemented by a separate machine or computer, or as part of another machine or computer of the system.

In FIG. 2, the detector 3 is a rotational detector array that rotates with the X-ray tube 1 with respect to the longitudinal axis. As discussed below, but not shown in FIG. 2, a stationary detector array can also be included, thus providing a rotating detector array and a stationary array, together, in the frame 8. Other detectors can be implemented.

FIG. 3 is a schematic diagram of a mechanically simplified CT apparatus with a detector extending in a direction of a longitudinal axis. FIG. 3 is a side view of the CT apparatus shown in FIG. 2, illustrating a rotating detector array and a stationary array, together, in the frame 8. In particular, FIG. 2 is a view of a CT apparatus from the perspective of a longitudinal axis L, where this axis extends into and out of the page. In FIG. 3, the longitudinal axis L extends side-to-side across the page.

FIG. 3 illustrates a rotating detector 3 as having a detector axis D as also extending side-to-side across the page. D is generally, substantially or effectively parallel to L. That is, the relationship between these two axes is parallel within a margin of a 2°, 1°, or less. According to the various aspects described herein, a perfect geometrically "parallel" or "perpendicular" relationship is not generally necessary, and a "general, substantial or effective" relationship is suitable within a margin of 2°, 1°, or less.

The rotating detector 3 can rotate together with the X-ray tube 1 about the longitudinal axis L. A series of stationary detector arrays 3' can be provided, in a periodic or irregular fashion, around the frame 8, and can form a circular shape when viewed along the longitudinal axis L.

The series of stationary detector arrays 3' can be provided along respective detector axes D', which extend side-to-side across the page. D' is generally, substantially or effectively parallel to L and D. That is, the relationship between these axes is parallel within a margin of a 2°, 1°, or less. According to the various aspects described herein, a perfect geometrically "parallel" or "perpendicular" relationship is not generally necessary, and a "general, substantial or effective" relationship is suitable within a margin of 2°, 1°, or less.

FIG. 3 also illustrates a patient table extending into the bore of the frame 8, and the fan or cone 10. The fan or cone 10 has a major length in the side-to-side dimension in the view of FIG. 2, and a minor length in the side-to-side dimension in the view of FIG. 3. In exemplary implementations, the fan or cone 10 can impinge upon both the detector array 3 and one of the detector arrays 3'. Further, although FIG. 3 illustrates the detector array 3 and the detector arrays 3' as having a common dimensional length in the z-direction, other implementations include varying lengths in the z-direction between the detector array 3 and the detector arrays 3' or amongst the detector arrays 3'.

Aspects of this disclosure relate to improving spatial resolution in iterative CT reconstruction. An exemplary goal is to estimate a high-resolution projection data that minimizes a difference with measured projection data. An exemplary method discussed herein can improve spatial resolution with both numerical simulations and real CT data, without side-effects of aliasing artifacts. This disclosure relates to CT reconstruction, iterative reconstruction algorithms, forward projections, and system optics models. Aspects of this disclosure also relate to overcoming a detector sampling limitation.

An exemplary algorithm 400 in accordance with this disclosure is illustrated in FIG. 4. In FIG. 4, at S402, a medical imaging system or computer performs an initial reconstruction in a high-resolution mode to obtain an intermediate image of original data from a medical imaging process, where the original data is of or for a scanned object. At S404, high-density forward projection (HD-FPJ) of the intermediate image is executed to obtain generated data. At S406, sinogram updating is executed using both the original data and the generated data to obtain a high-resolution sinogram. A final reconstruction is then executed at S408 to obtain a high-resolution image for the scanned object.

The exemplary algorithm is discussed in more detail below with reference to FIG. 5 and the exemplary algorithm 500 illustrated therein.

At S502 of FIG. 5, data is input into a system (e.g., a computer, processor or digital data processing device or circuit). The data can be in the form of an image or matrix. The matrix, in an exemplary implementation, can have a size of 896 (i.e., a number of detector channels)×900 (i.e., a number of views for a CT scan). Other sizes are possible. This data is stored in a memory device, such as an electronic memory that stores digital data.

At S504, the data is subjected to convolution for filtering by, e.g., a Fourier transform, such as Fast Fourier Transform (FFT), at an FFT size of, e.g., 512 (i.e., 512 bins). At S506, back-projection (BPJ) is performed using a matrix having, in an exemplary implementation, a size of 1024×1024.

After the BPJ at S506, a high density forward projector (HD-FPJ) is applied at S508. The HD-FPJ computes ray-sums with denser sampling than determined by the detector of the imaging system. Therefore, the HD-FPJ provides ray-sums that are not measured by the detector, as well as ray-sums at measured positions. At this step, the following two considerations are balanced:

(1) Generated ray-sums at the measured angles are blurrier than measured data, since the reconstructed function is not as sharp as the original scanned object; and (2) Generated ray-sums between the measured rays provide new information to each projection.

Since the rays are forward-projected through the image that is an accumulation of all views, these rays cannot be estimated from each view alone, for example by linear or non-linear interpolation.

At S510, sinogram upsampling (updating) is executed, which utilizes both original single-sampled data (from S502) and generated higher-sampled data (from S508). The goal of this step is to estimate a high-resolution sinogram. One approach to obtain an upsampled sinogram is by a conventional least squares minimization, similar to a Fourier-based optimal recovery method for antialiasing interpolation, where double-sampled generated data is used as a priori information. In an exemplary implementation according to this disclosure, a simpler approach is utilized to estimate the upsampled sinogram.

In the following, x denotes the original sinogram, y denotes the generated sinogram, and z denotes the upsampled sinogram:

$$z(2k)=x(k), \text{ and}$$

$$z(2k+1)=y(2k+1)+(\Delta(k)+\Delta(k+1))/2,$$

where $\Delta(k)=x(k)-y(2k)$.

This implementation can be considered as a variant of a conventional pan-sharpening approach in the raw data domain. Here, reprojected data corresponds to the high resolution pan-chromatic image, and a measured projection corresponds to the spectral image. A goal here is to estimate a high-resolution projection data that minimizes the difference with measured projection.

Adverting back to FIG. 5, S512-S516 define a reconstruction process for high-resolution projection data resulting from the sinogram updating in S510. At S512, the projection data (i.e., the updated/upsampled sinogram—the high resolution sinogram) is convolved with a filtering kernel by means of a FFT with twice the original FFT size. That is, the FFT size for S512 can be 1024 (i.e., 1024 bins). A back-projection is performed at S514 using a large matrix of a size of, e.g., 1024×1024. At S516, the resulting reconstructed image can be output to, e.g., a display or other processing device.

Figure 6:
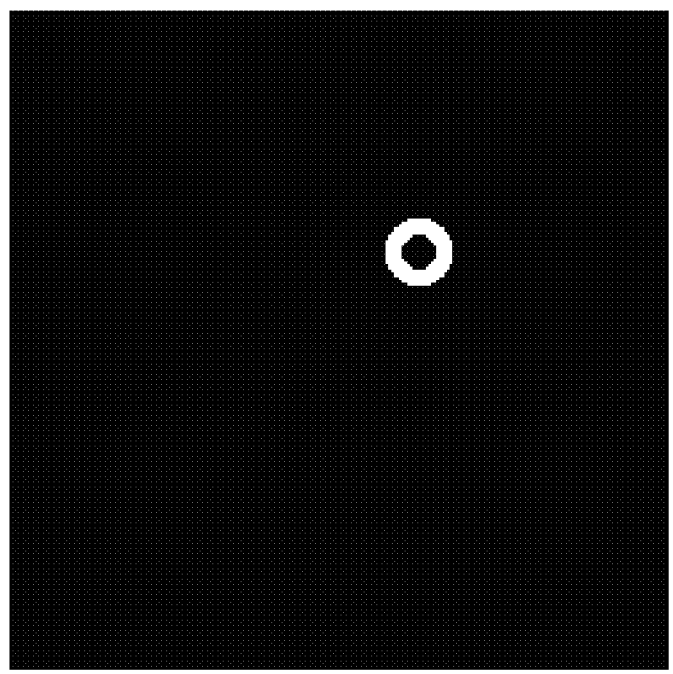
FIG. 6 illustrates an exemplary phantom.

This approach was tested with simulated and real CT data. The data simulation parameters and geometry are given in Table 1 and a simulated small donut phantom used in the implementations discussed herein is illustrated in FIG. 6.

TABLE 1

| Phantom Geometry. | |
|---|---|
| Center, mm | (7, 5) |
| Radius, mm | 2/1 |
| Fan angle | 9.2° |
| Ray pitch | 0.055° |
| Views | 300 |
| FCD, mm | 600 |

Figure 7:
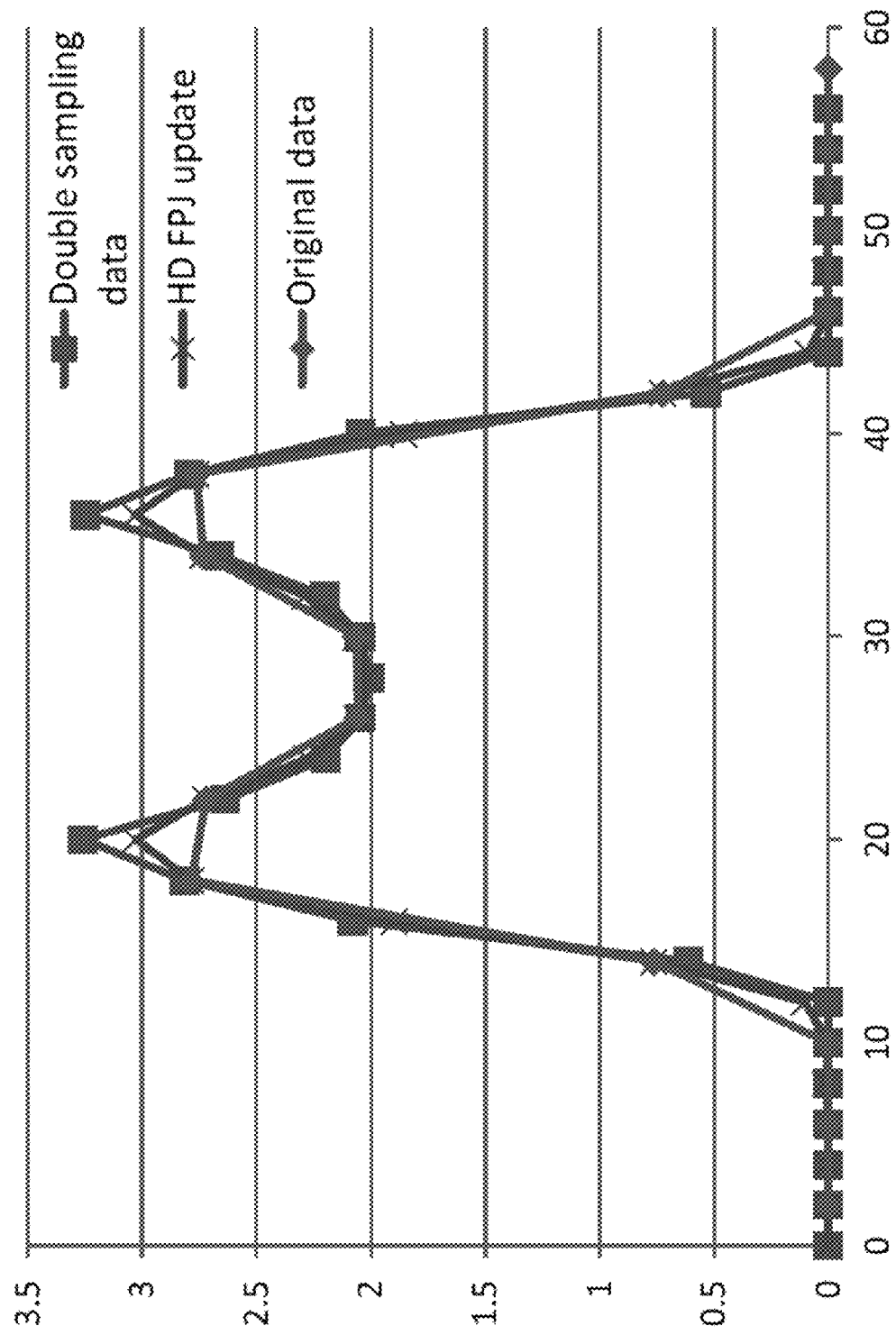
FIG. 7 is a graph illustrating data line profiles.

FIG. 7 illustrates data line profiles for double sampling data, HD-FPJ update (corresponding to HD-FPJ step S506), and the original data. In FIG. 7, the HD-FPJ update effectively transforms the original data to more closely resemble the double-sampling data. Due to small phantom size, original samples miss the edges of the phantom (original data line). These edges can be at least partially recovered by HD-FPJ (HD-FPJ update line). For reference, true double sampling is also illustrated (double-sampling data line). The HD-FPJ update line only utilizes original single-sampling data.

Figure 8:
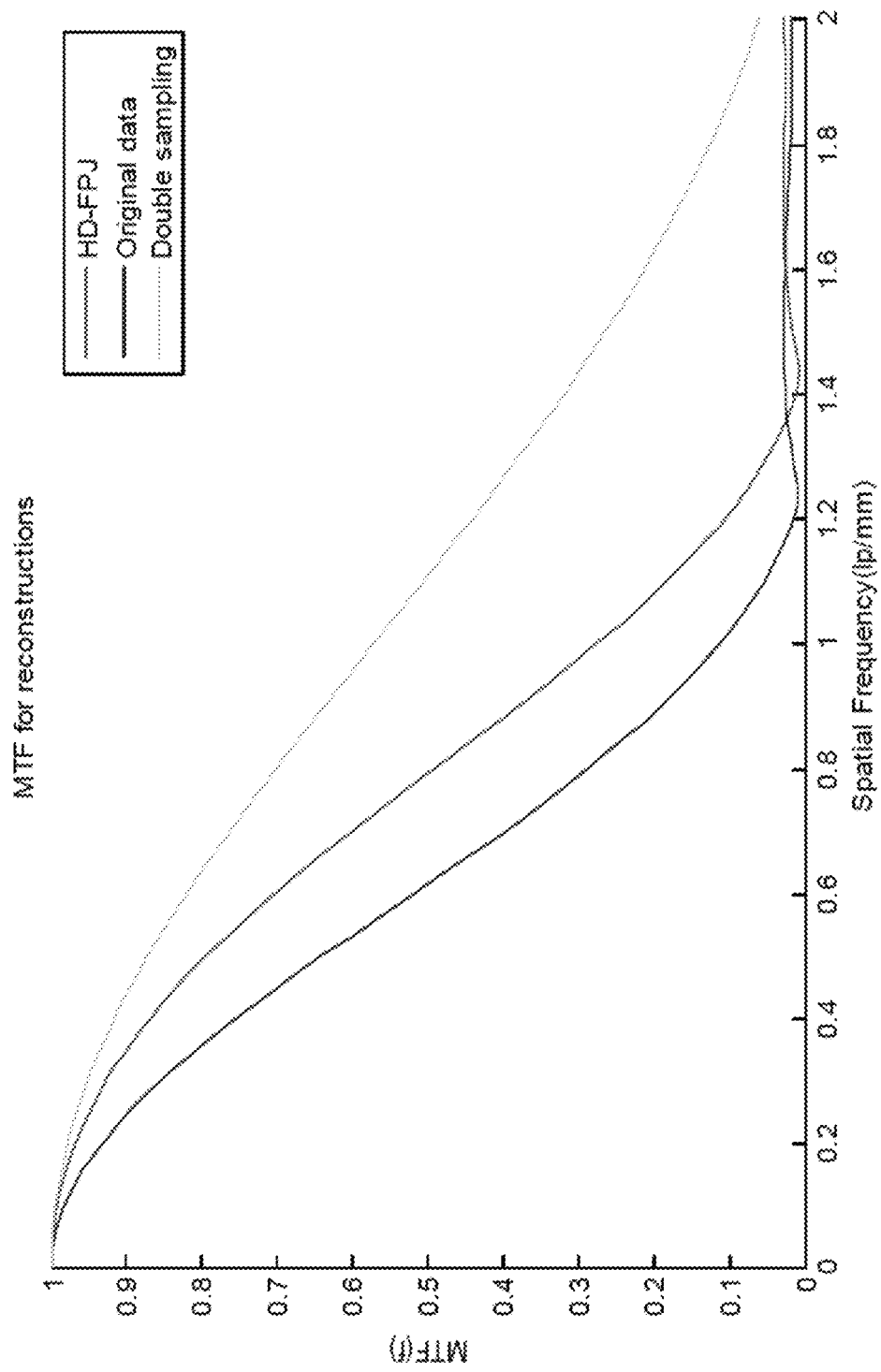
FIG. 8 illustrates MTF profiles.

Modulation transfer function (MTF) results are illustrated in FIG. 8 for the double-sampling data, HD-FPJ update, and original data. FIG. 8 illustrates improved Nyquist frequency and improved spatial resolution with HD-FPJ in comparison to using the original data alone.

Figure 9A:
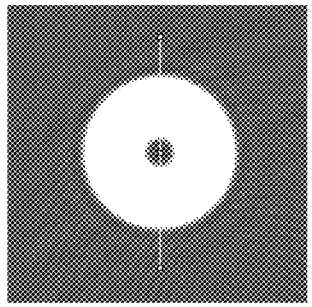
FIGS. 9A-9B illustrate image results using simulated data.
Figure 9B:
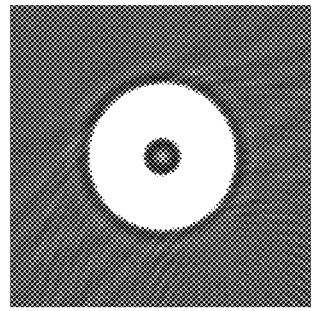

The result of using simulated data is illustrated in FIGS. 9A-9B. FIG. 9A illustrates original simulated data, and FIG. 9B illustrates HD-FPJ update simulated data.

Figure 10A:
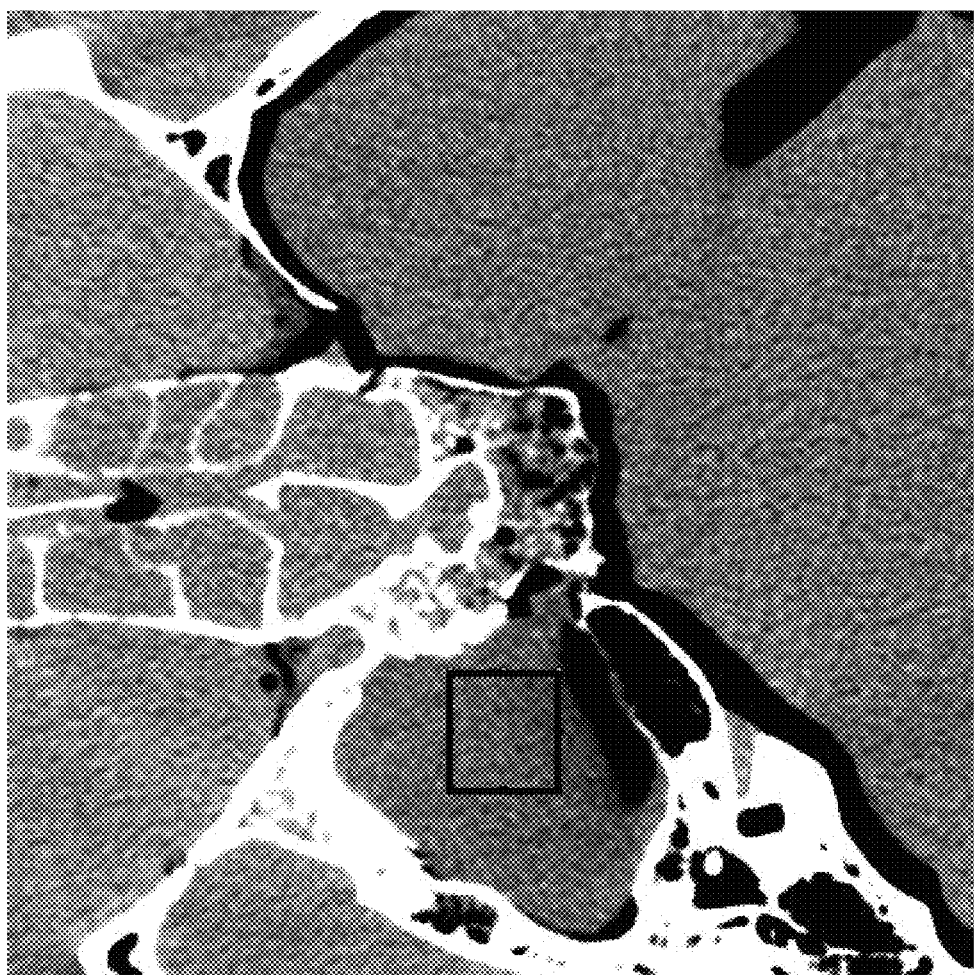
FIGS. 10A-10B illustrate image results using real CT data.
Figure 10B:
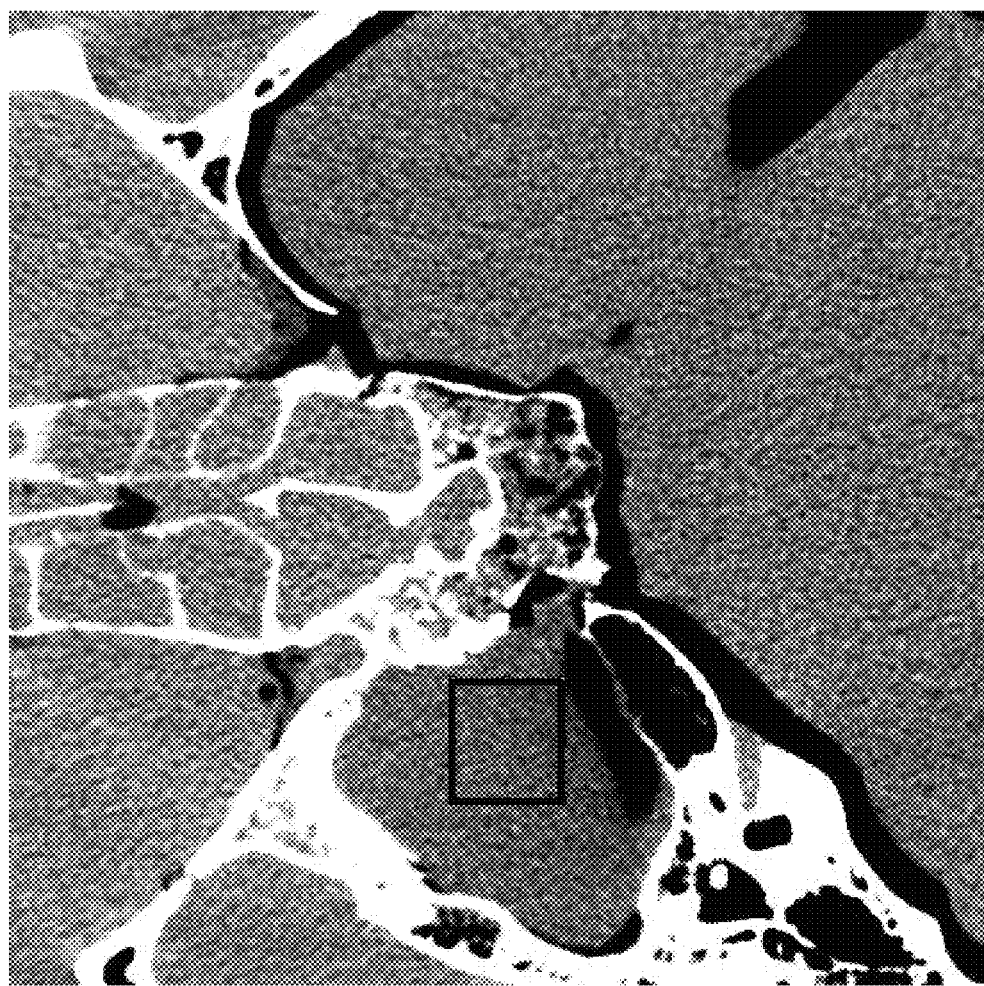

FIGS. 10A-10B illustrate reconstructed images for original data (FIG. 10A) and in accordance with the proposed approach (FIG. 10B—utilizing HD-FPJ).

For comparison simulated data was used with half sampling pitch (double sampling). Double sampling is used as a target, since it provides a greatly improved spatial resolution. Results with real CT data of a head phantom are illustrated in FIGS. 10A and 10B, which is an image zoomed into sinus bones to demonstrate resolution improvement of the proposed approach.

The proposed approach improves sinogram sampling and results in increased spatial resolution. Deconvolution methods often lead to strong aliasing artifacts, as well as overshoot artifacts, which is an undesired side-effect of resolution improvement. With the proposed approach, since it is directed at improving the sampling rate of original data, aliasing artifacts are kept under control, as the results with real data illustrate.

Zoomed reconstruction often suffers from large noise grains, which can be characterized by a shift of the noise power spectra (NPS) towards low frequencies. Large noise grains are caused when detector pixel size becomes larger than the image voxel size. Therefore, the proposed approach improves noise texture, as shown in FIGS. 9A and 9B—see the rectangular regions thereof for comparison.

Since the proposed method improves accuracy of the forward projection, it can be used with iterative reconstruction, and combined with deconvolution techniques for further spatial resolution improvement. HD-FPJ improves the accuracy of system optics modeling since it provides better sampling of the voxel projection footprint.

Figure 11:
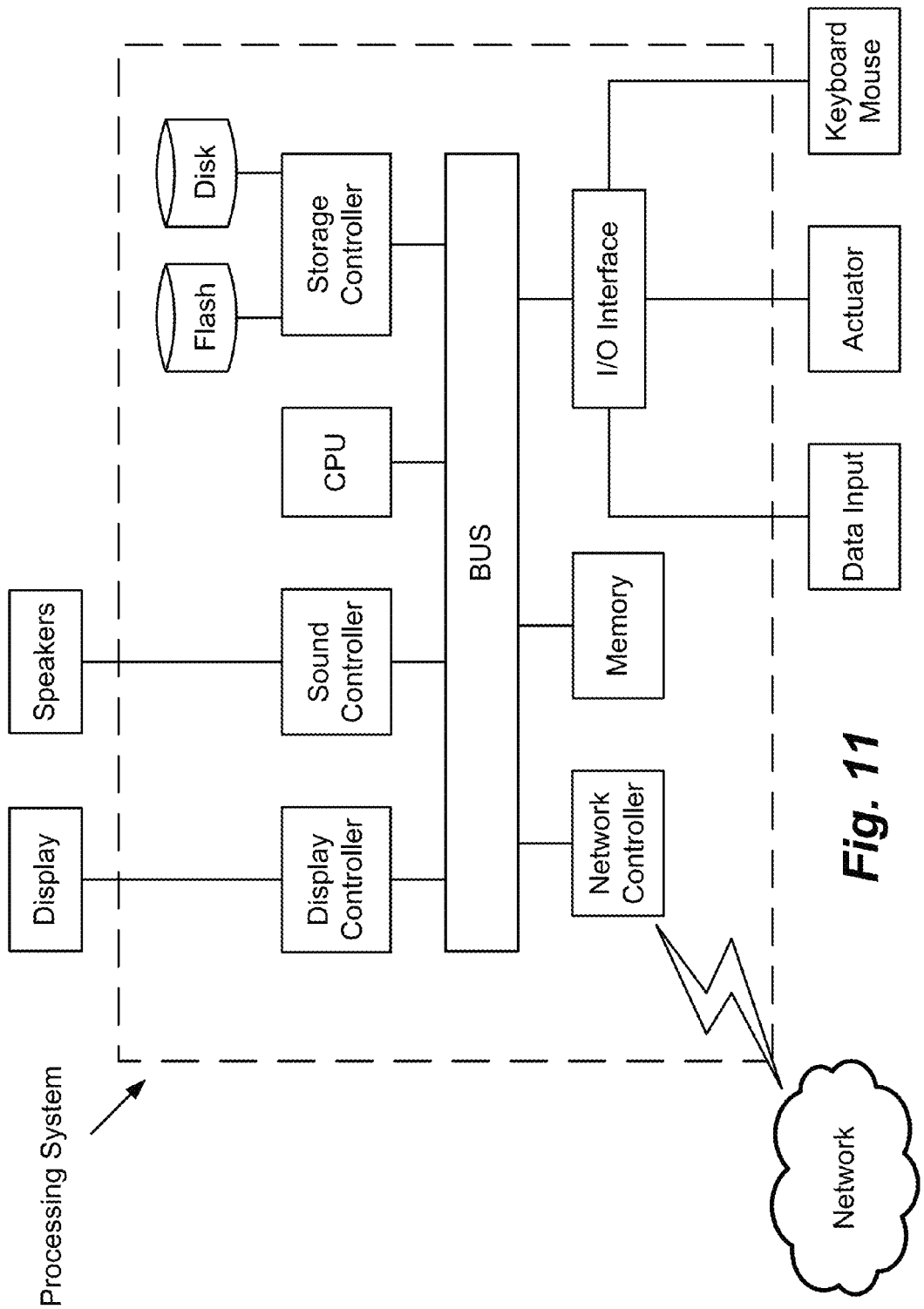
FIG. 11 is a schematic diagram of an exemplary processing system.

With reference to the structures illustrated in FIG. 2, an exemplary processing system is illustrated in FIG. 11. This exemplary processing system can be implemented using one or more microprocessors or the equivalent, such as a central processing unit (CPU) and/or at least one application specific processor ASP (not shown). The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU and a graphics processing unit (GPU) to achieve improved computational efficiency. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

The data acquisition system 5, the processor 6 and the memory 7 of FIG. 2 can be implemented utilizing one or more processing systems in accordance with the exemplary implementation shown in FIG. 11. In particular, one or more circuits or computer hardware units coinciding with one or more of the devices illustrated in FIG. 11 can provide for the functions of the data acquisition system 5, the processor 6 and the memory 7. The functional processing described herein can also be implemented in one or more specialized circuits including circuits to perform the described processing. Such circuits can be a part of a computer processing system or a discrete device that is interconnected to other systems. A processor in accordance with this disclosure can also be programmed to or configured to execute the functional processing described herein by computer code elements.

Further, the processing systems, in one implementation, can be connected to each other by a network or other data communication connection. One or more of the processing systems can be connected to corresponding actuators to actuate and control movement of the gantry, the X-ray source, and/or the patient bed.

Suitable software can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The Data Input portion of the processing system accepts input signals from a detector or an array of detectors by, e.g., respective wired connections. A plurality of ASICs or other data processing components can be provided as forming the Data Input portion, or as providing input(s) to the Data Input portion. The ASICs can receive signals from, respectively, discrete detector arrays or segments (discrete portions) thereof. When an output signal from a detector is an analog signal, a filter circuit can be provided, together with an analog-to-digital converter for data recording and processing uses. Filtering can also be provided by digital filtering, without a discrete filter circuit for an analog signal. Alternatively, when the detector outputs a digital signal, digital filtering and/or data processing can be performed directly from the output of the detector.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover such forms or modifications as would fall within the scope and spirit of this disclosure.

The invention claimed is:

1. An apparatus, comprising:
    a processor to execute processing of a first sinogram obtained from a scan of a target object, the first sinogram including a first number of data points corresponding to channels of a detector used to perform the scan, the processing including:
        a first reconstruction of the first sinogram to obtain an intermediate image of the target object,
        a high-density forward projection of the intermediate image to obtain generated data, the generated data including a second number of data points, the second number being greater than the first number,
        generating a second sinogram having the second number of data points using both the generated data and the first sinogram, wherein at least one data point of the second sinogram is calculated based on a difference between data points from the first sinogram and data points of the generated data, and a second reconstruction based on the second sinogram to obtain an output image.

2. The apparatus according to claim 1, wherein the processor is further configured to execute the first reconstruction, which includes a convolution executed on the first sinogram to filter the first sinogram using a Fourier transform.

3. The apparatus according to claim 2, wherein the processor is further configured to execute the first reconstruction, which includes executing a back-projection, after the convolution, to obtain the intermediate image.

4. The apparatus according to claim 1, wherein the processor is further configured to execute the generating of the second sinogram in accordance with the following relationships, in which x denotes the first sinogram, y denotes the generated data, and z denotes the second sinogram:

$z(2k)=x(k)$, and $z(2k+1)=y(2k+1)+(\Delta(k)+\Delta(k+1))/2$, where $\Delta(k)=x(k)-y(2k)$.

5. The apparatus according to claim 1, wherein the processor is further configured to execute the second reconstruction, which includes a convolution executed to filter the second sinogram by a Fourier transform.

6. The apparatus according to claim 5, wherein the processor is further configured to execute the second reconstruction, which includes executing a back-projection, after the convolution, to obtain the output image.

7. The apparatus according to claim 1, wherein the processor is further configured to execute:
the first reconstruction, which includes a first convolution executed on the first sinogram to filter the first sinogram by a Fast Fourier Transform (FFT) having a first size, and then a first back-projection executed utilizing a first matrix; and
the second reconstruction, which includes a second convolution executed on the second sinogram to filter the second sinogram by a Fast Fourier Transform (FFT) having a second size, which is twice the size of the first size, and then a second back-projection executed utilizing a second matrix.

8. The apparatus according to claim 7, wherein the processor is further configured to execute:
the first reconstruction, which includes the first convolution executed on the first sinogram to filter the first sinogram by the FFT having the first size of 512 bins, and
the second reconstruction, which includes the second convolution executed on the second sinogram to filter the second sinogram by the FFT having the second size of 1024 bins.

9. The apparatus according to claim 8, wherein the processor is further configured to execute the first and second reconstruction utilizing the first and second matrices, respectively, each having a size of 1024×1024.

10. The apparatus according to claim 1, further comprising a CT scanner to perform the scan of the target object.

11. The apparatus according to claim 1, further comprising:
an input interface to input the first sinogram.

12. The apparatus according to claim 1, further comprising:
an output interface to output the output image.

13. The apparatus according to claim 1, further comprising:
a display to display the output image.

14. The apparatus according to claim 1, wherein the processor is further configured to generate the second sinogram using both the generated data and the first sinogram to improve a spatial resolution of the output image from the second reconstruction relative to the intermediate image of the second reconstruction.

15. The apparatus of claim 1, wherein the processor is configured to execute the high-density forward projection to obtain the generated data so that the second number of data points includes data representing ray-sums at locations that do not correspond to the channels of the detector used to perform the scan, and includes data representing ray-sums that do correspond to the channels of the detector used to perform the scan.

16. The apparatus according to claim 1, wherein the processor is further configured to generate the second sinogram having the second number of data points using both the generated data and the first sinogram, wherein all data points of the second sinogram are calculated based on data points from the first sinogram.

17. A medical imaging method, comprising:
performing a first reconstruction of a first sinogram obtained from a scan of a target object to obtain an intermediate image of the target object, the first sinogram including a first number of data points corresponding to channels of a detector used to perform the scan;
performing a high-density forward projection of the intermediate image to obtain generated data, the generated data including a second number of data points, the second number being greater than the first number;
generating a second sinogram having the second number of data points using both the generated data and the first sinogram, wherein at least one data point of the second sinogram is calculated based on a difference between data points from the first sinogram and data points of the generated data;
performing a second reconstruction based on the second sinogram to obtain an output image; and
outputting the output image.

18. A non-transitory computer-readable medium including executable instructions, which when executed by a computer processor, cause the computer processor to execute a method comprising:
performing a first reconstruction of a first sinogram obtained from a scan of a target object to obtain an intermediate image of the target object, the first sinogram including a first number of data points corresponding to channels of a detector used to perform the scan;
performing a high-density forward projection of the intermediate image to obtain generated data, the generated data including a second number of data points, the second number being greater than the first number;
generating a second sinogram having the second number of data points using both the generated data and the first sinogram, wherein at least one data point of the second sinogram is calculated based on a difference between data points from the first sinogram and data points of the generated data;
performing a second reconstruction based on the second sinogram to obtain an output image; and
outputting the output image.

* * * * *